US008029047B2

(12) United States Patent
Kim et al.

(10) Patent No.: US 8,029,047 B2
(45) Date of Patent: Oct. 4, 2011

(54) CENTER PILLAR ASSEMBLY FOR VEHICLE

(75) Inventors: Do Hoi Kim, Uiwang-si (KR); Jong Weon Seo, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/821,611

(22) Filed: Jun. 23, 2010

(65) Prior Publication Data

US 2011/0127802 A1 Jun. 2, 2011

(30) Foreign Application Priority Data

Dec. 2, 2009 (KR) ........................ 10-2009-0118636

(51) Int. Cl.
*B60J 7/00* (2006.01)

(52) U.S. Cl. .............................. 296/193.06; 296/187.12

(58) Field of Classification Search ............. 296/193.06, 296/187.12
See application file for complete search history.

(56) References Cited

U.S. PATENT DOCUMENTS 5,246,264 A 9/1993 Yoshii
6,332,643 B1 * 12/2001 Sukegawa et al. ....... 296/203.03
6,988,763 B2 * 1/2006 Saeki ...................... 296/187.12

FOREIGN PATENT DOCUMENTS

JP 4-154458 A 5/1992
JP 9-188274 A 7/1997
JP 2002-53068 A 2/2002

* cited by examiner

*Primary Examiner* — Joseph Pape
(74) *Attorney, Agent, or Firm* — Morgan, Lewis & Bockius LLP

(57) ABSTRACT

A center pillar assembly for a vehicle may include a center pillar panel which is not connected to a side reinforcing panel at one end thereof, and a center pillar reinforcing member connecting the other one end of the center pillar panel with the side reinforcing panel for reinforcing the center pillar panel.

5 Claims, 5 Drawing Sheets

60
50
30
40
20
80
65

CENTER PILLAR ASSEMBLY FOR VEHICLE

CROSS-REFERENCE TO RELATED APPLICATION

The present application claims priority to Korean Patent Application No. 10-2009-0118636, filed on Dec. 2, 2009, the entire contents of which is incorporated herein for all purposes by this reference.

BACKGROUND OF THE INVENTION

1. Field of the Invention

The present invention relates to a structure for reinforcing a center pillar of a vehicle, and more particularly, to a center pillar assembly capable of enhancing strength of a roof and decreasing weight and cost.

2. Description of Prior Art

A structure for reinforcing a center pillar of a vehicle according to a related art includes an inner center pillar panel 110, an outer center pillar panel 120 which is connected to the inner center pillar panel 110, and a center pillar reinforcing member 130 which is connected to the outer center pillar panel 120 to reinforce the strength of the center pillar.

The center pillar reinforcing member 130 is constituted of a first reinforcing member 131 and a second reinforcing member 132 which are welded to each other.

The second reinforcing member 132 has a ⊓-shaped cross section, and is welded to an intermediate portion of the first reinforcing member 131 to reinforce the center pillar.

In the structure for reinforcing the center pillar of the vehicle according to the related art, since there is a gap (portion G) between the second reinforcing member 132 and the inner center pillar panel 110, the second reinforcing member 132 does not properly transmit a force to the inner center pillar panel 110 at a roof crush test, and thus a portion indicated by a line A-A is bent.

In order to solve the above problem, the shape of the second reinforcing member 132 may be changed so that the second reinforcing member 132 comes in contact with the inner center pillar panel 110 as mush as possible. This causes the weight and manufacturing cost to increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a center pillar assembly for a vehicle capable of enhancing strength of a roof and decreasing weight and cost A center pillar assembly for a vehicle may include a center pillar panel which is not connected to a side reinforcing panel at one end thereof, and a center pillar reinforcing member connecting the other one end of the center pillar panel with the side reinforcing panel for reinforcing the center pillar panel.

The center pillar panel may include an inner center pillar panel and an outer center pillar panel which are faced and connected to each other, and one end of the outer center pillar panel is not connected to the side reinforcing panel.

The side reinforcing panel may include a roof rail side portion and a side sill connected to the roof rail side portion, and an upper end of the outer center pillar panel is not connected to the roof rail side portion.

The center pillar reinforcing member disposed between the outer and inner center pillar panels may include a reinforcing body having an inner engaging surface engaged to the inner center pillar panel, and an outer engaging surface engaged to the outer center pillar panel, and an engaging piece extended from the reinforcing body and connected to the roof rail side portion.

A lower end of the center pillar panel may not be connected to the side sill.

A flange may be formed on a lateral side of the inner engaging surface and is engaged between the inner center pillar panel, wherein the reinforcing body has a ⎍-shaped cross section.

The engaging piece may be formed in T-shape.

The outer center pillar panel may be made of a high-strength steel sheet.

The center pillar panel may include an outer center pillar panel connected to the center pillar reinforcing member and the center pillar reinforcing member is connected to a center pillar trim.

With the above description, according to the present invention, there is provided the center pillar assembly for the vehicle capable of reducing the weight and manufacturing cost.

Further, the center pillar assembly of the invention can enhance the strength of the roof.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
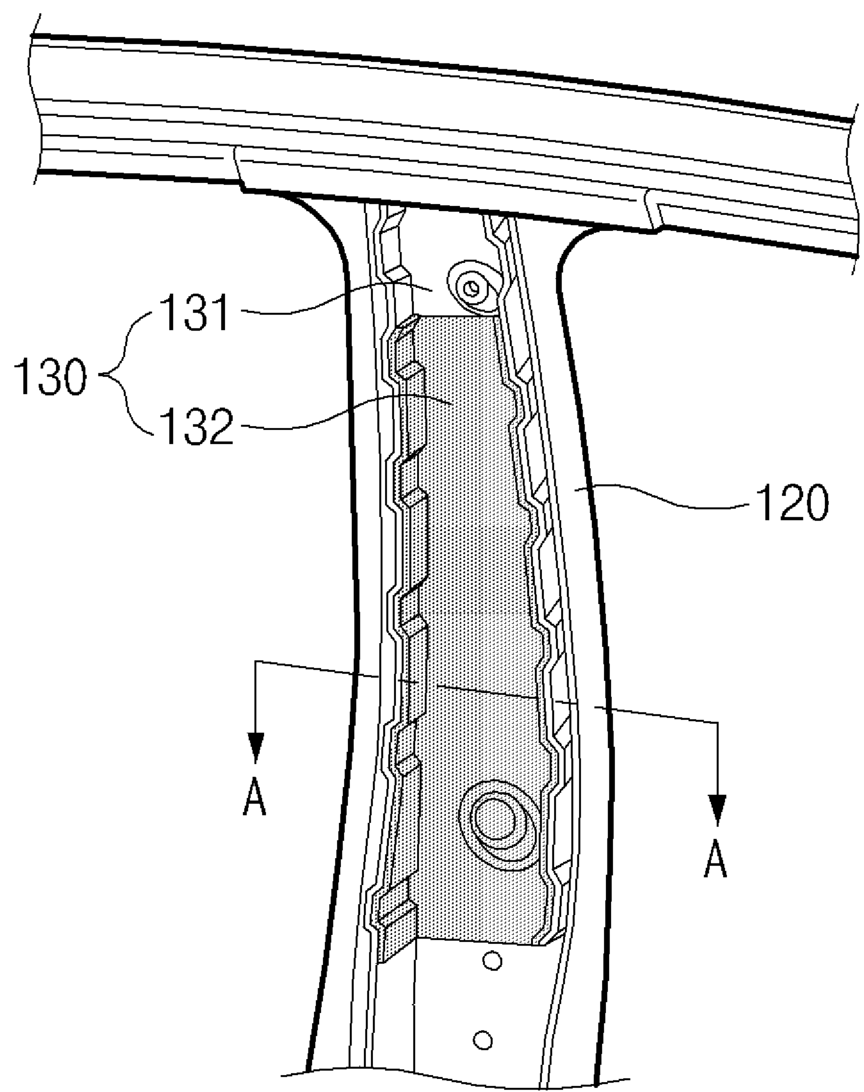
FIG. 1 is a perspective view illustrating a structure for reinforcing a center pillar of a vehicle according to a related art.
Figure 2:
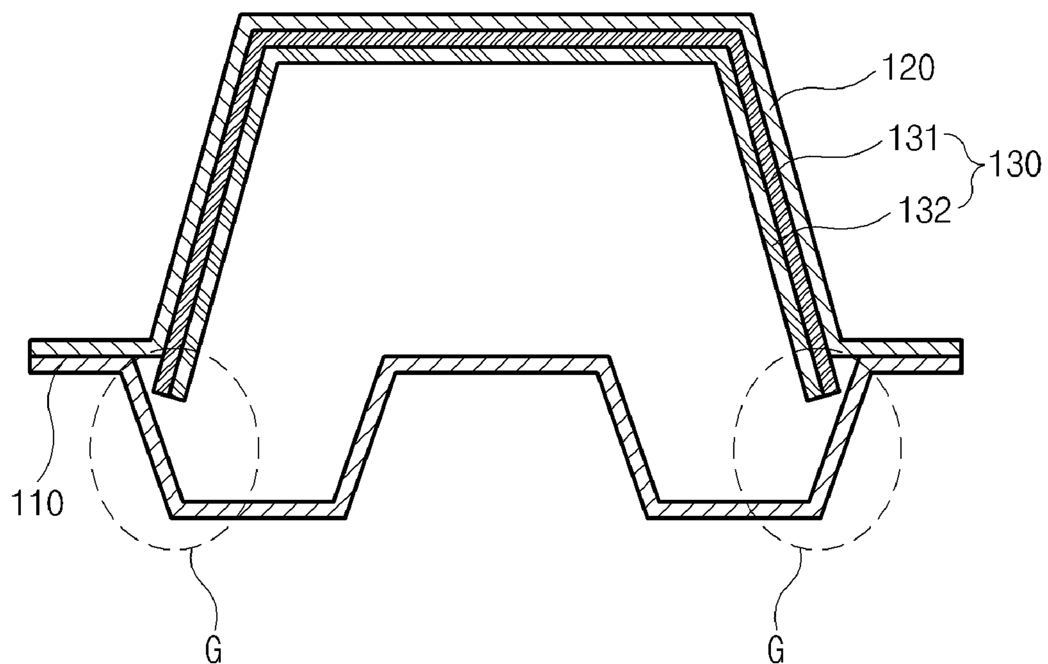
FIG. 2 is a cross-sectional view taken along a line A-A in FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 3:
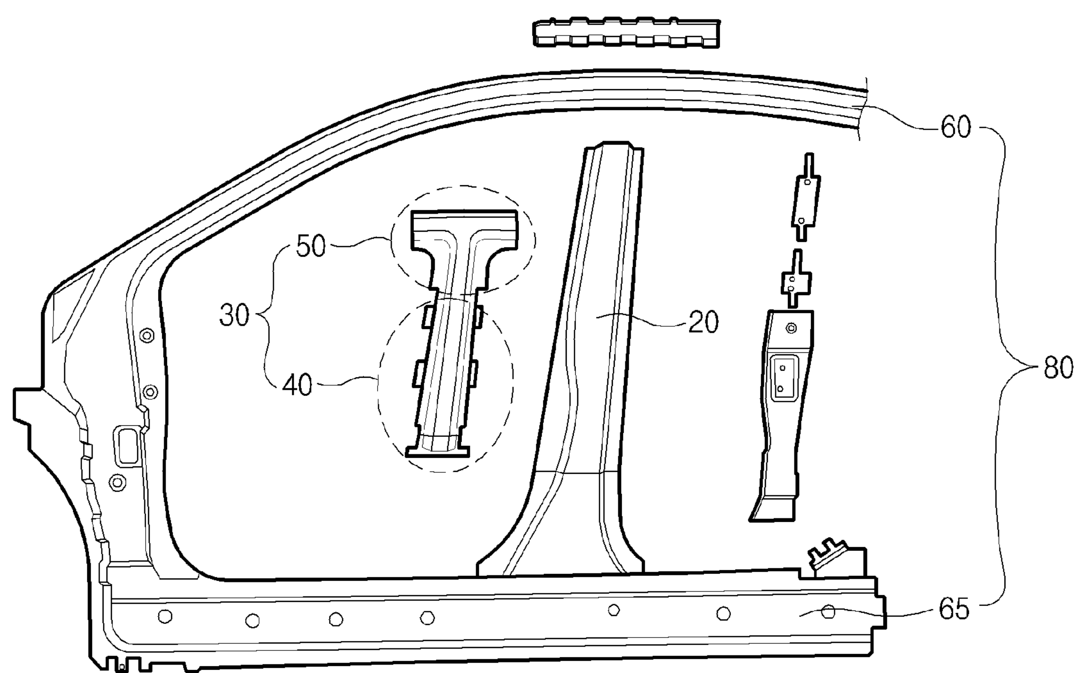
FIG. 3 is an exploded perspective view illustrating an exemplary center pillar assembly for a vehicle according to the present invention.
Figure 4:
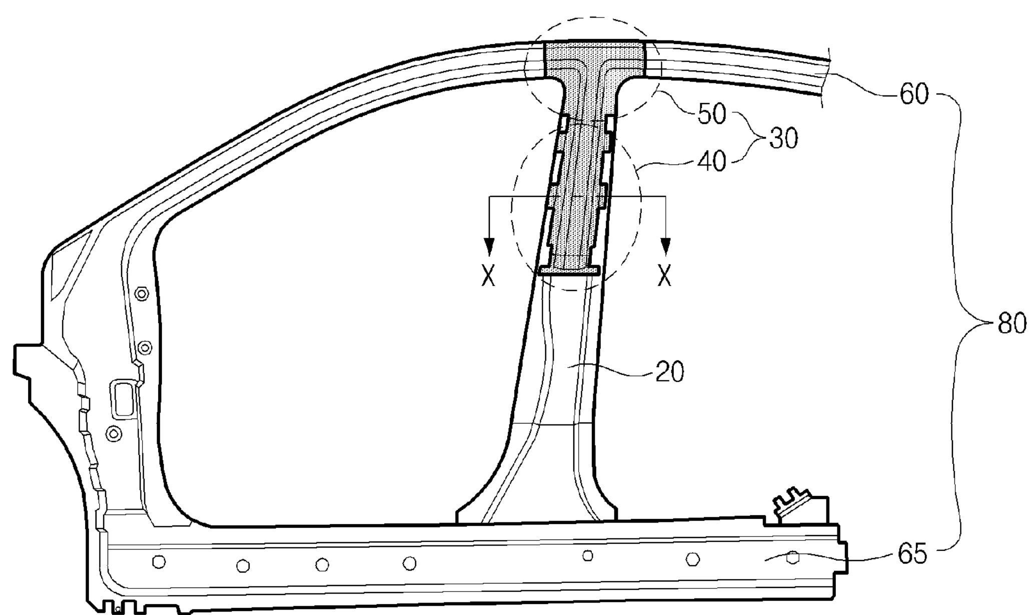
FIG. 4 is a perspective view illustrating an assembled state of the center pillar assembly in FIG. 3.
Figure 5:
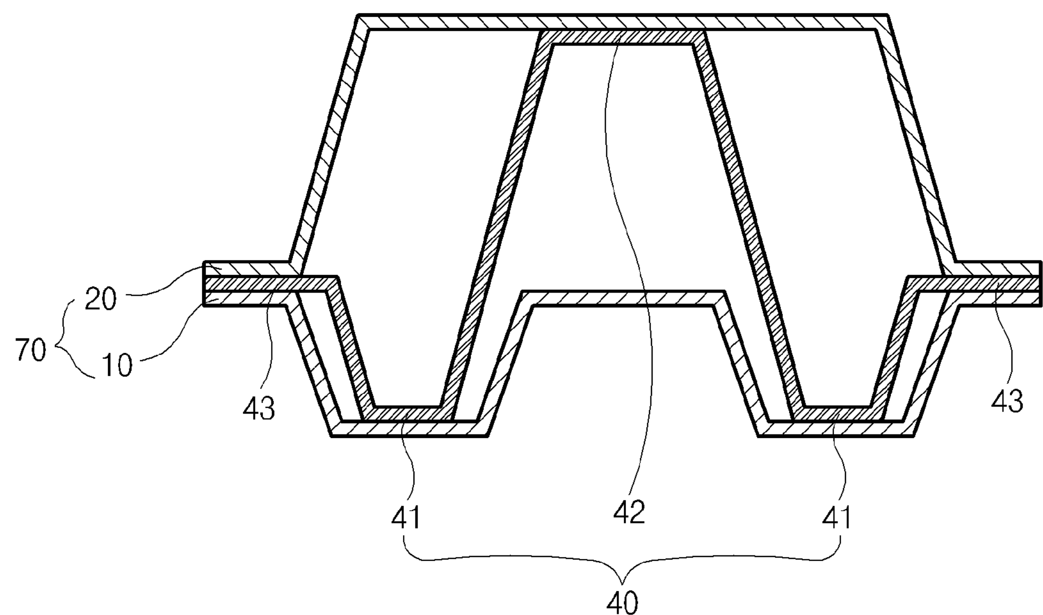
FIG. 5 is a cross-sectional view taken along a line X-X in FIG. 4.

FIG. 3 is an exploded perspective view illustrating a center pillar assembly for a vehicle according to an exemplary embodiment of the present invention. FIG. 4 is a perspective view illustrating an assembled state of the center pillar assembly in FIG. 3. FIG. 5 is a cross-sectional view taken along a line X-X in FIG. 4.

The center pillar assembly for the vehicle according to an exemplary embodiment of the present invention includes a center pillar panel 70 which is not connected to a side reinforcing panel 80 at one end thereof, and a center pillar reinforcing member 30 for connecting the one end of the center pillar panel 70 with the side reinforcing panel 80.

The center pillar panel 70 includes an inner center pillar panel 10 and an outer center pillar panel 20 which are faced and connected to each other, and the center pillar reinforcing member 30 is welded between the inner center pillar panel 10 and the outer center pillar panel 20 to reinforce strength of the center pillar panel.

The outer center pillar panel 20 is welded to the inner center pillar panel 10, with the center pillar reinforcing member 30 being interposed between the inner center pillar panel 10 and the outer center pillar panel 20. In this instance, the outer center pillar panel 20 is preferably made of a high-strength steel sheet of 980 MPA or more in order to reduce the weight.

The side reinforcing panel 80 includes a roof rail side portion 60 and a side sill 65 connected to the roof rail side portion 60 and positioned under a vehicle body.

It is preferable that the outer center pillar panel 20 is formed in such a way that the upper end is not connected to the roof rail side portion 60. The reason is that in the case in which the high-strength steel sheet of 980 MPA or more is extended and welded to the roof rail side portion 60, a corner portion engaged to the roof rail side portion 60 bursts. Therefore, it prevents the outer center pillar panel 20 from being burst. Further, there is an advantage of reducing the weight and manufacturing cost in comparison with the outer center pillar panel 120 of the related art which is connected to the roof rail side portion 60.

The center pillar reinforcing member 30 includes a reinforcing body 40 having a ∩-shaped cross section, and an engaging piece 50 extended from the upper end of the reinforcing body 40 and engaged to the roof rail side portion 60. The center pillar reinforcing member 30 is made of a steel sheet of 590 MPA, so that the formability between the engaging piece 50 and the roof rail side portion 60 is appropriate in comparison with the high-strength steel sheet of 980 MPA or more.

The reinforcing body 40 includes two inner engaging surfaces 41 engaged to the inner center pillar panel 10, and an outer engaging surface 42 upwardly extended from the inner engaging surface 41 (when setting up a cross section of FIG. 5 as a reference) and engaged to the outer center pillar panel 20.

In this instance, a flange 43 is formed on a lateral side of the respective inner engaging surfaces 41 and is engaged between the inner center pillar panel 10 and the outer center pillar panel 20.

The T-shaped engaging piece 50 is engaged to the roof rail side portion 60 to connect the outer center pillar panel 20 which is not connected to the roof rail side portion 60, with the roof rail side portion 60.

In this way, the center pillar reinforcing member 130 of the related art is formed in such a way that the first reinforcing member 131 and the second reinforcing member 132 are separately manufactured and then are welded to each other. On the contrary, according to the center pillar reinforcing member 30 of the present invention, any one of the two reinforcing members 131 and 132 is omitted, the contact surface with the inner center pillar panel 10 is maximized to remove a gap such as gap G, as the conventional case, thereby enhancing the strength of the roof.

In addition, the center pillar reinforcing member 30 is connected to the roof rail side portion 60 to further enhance the strength of the roof. The outer center pillar panel 20 is not connected to the roof rail side portion 60 to reduce the weight and manufacturing cost, in comparison with the case of the related art in which the center pillar reinforcing member 30 is connected to the outer center pillar panel 120 extended and connected to the roof rail side portion 60.

Moreover, since the outer center pillar panel 20 is made of the high-strength steel sheet of 980 MPA or more, the weight is significantly reduced.

In this exemplary embodiment, the upper end of the center pillar panel is not connected to the roof rail side portion.

However, in another exemplary embodiment of the present invention, the lower end of the center pillar panel is not connected to the side sill, and the center pillar reinforcing members may be connected to each other.

In further another exemplary embodiment of the present invention, the inner center pillar panel may be omitted, if necessary. In this instance, the center pillar reinforcing member may be connected between the outer center pillar panel and a center pillar trim.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center pillar assembly for a vehicle, comprising:

a side reinforcing panel including a roof rail side portion and a side sill connected to the roof rail side portion;

a center pillar panel including an inner center pillar panel and an outer center pillar panel which are connected to each other and an one end of the outer center pillar panel is not connected to the roof rail side portion; and a center pillar reinforcing member connecting a one end of the center pillar panel with the side reinforcing panel for reinforcing the center pillar panel;

wherein the center pillar reinforcing member disposed between the outer and inner center pillar panels includes a reinforcing body having an inner engaging surface engaged to the inner center pillar panel, and an outer engaging surface engaged to the outer center pillar panel, and an engaging piece extended from the reinforcing body and connected to the roof rail side portion.

2. The center pillar assembly as claimed in claim 1, wherein a flange is formed on a lateral side of the inner engaging surface and is engaged between the inner center pillar panel and the outer center pillar panel.

3. The center pillar assembly as claimed in claim 2, wherein the reinforcing body has a W-shaped cross section.

4. The center pillar assembly as claimed in claim 1, wherein the engaging piece is formed in T-shape.

5. The center pillar assembly as claimed in claim 1, wherein the outer center pillar panel is made of a high-strength steel sheet.

* * * * *